O. A. OWEN.
MOTION PICTURE FILM.
APPLICATION FILED AUG. 29, 1919.
1,347,053.
Patented July 20, 1920.
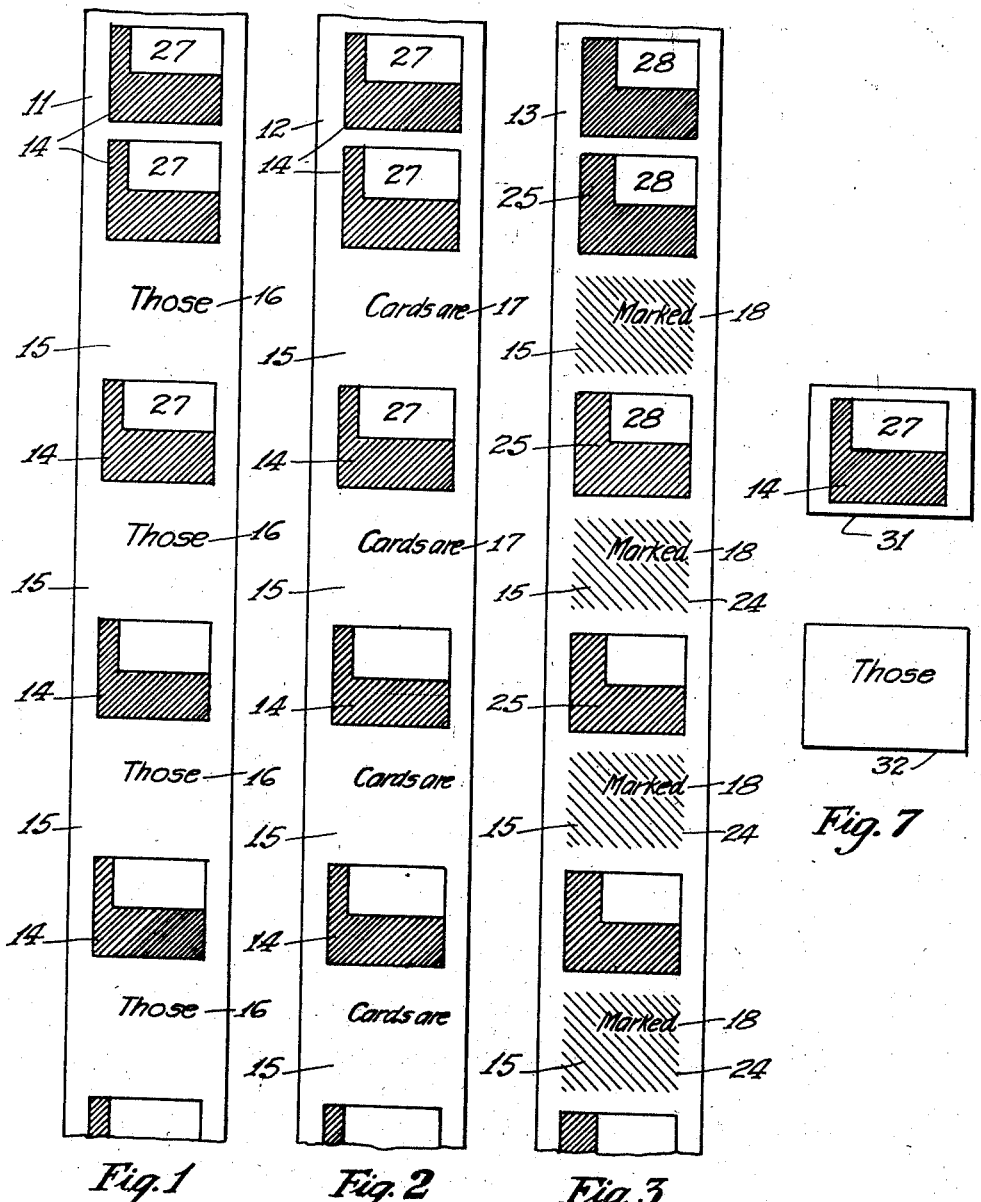
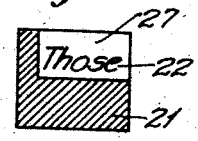
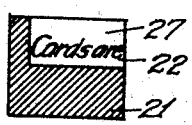
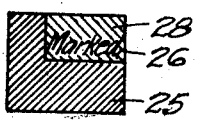
Inventor,
Ole Andrew Owen
By [signature]
Attorney

UNITED STATES PATENT OFFICE.

OLE ANDREW OWEN, OF NEW YORK, N. Y.

MOTION-PICTURE FILM.

1,347,053.  Specification of Letters Patent.  Patented July 20, 1920.

Application filed August 29, 1919. Serial No. 320,634.

*To all whom it may concern:*

Be it known that I, OLE ANDREW OWEN, a citizen of the United States, and a resident of New York, in the county of New York and State of New York, have invented certain new and useful Improvements in Motion-Picture Films, of which the following is a specification.

This invention relates to motion picture films and has for an object a means for mechanically dissolving views whereby certain features are introduced on the scene without preparing each picture specially for these features; another object is to produce words or short sentences in a scene without interrupting the continuous motion of the scene; a further object is the facilities by which these results are obtained in the preparation of the film negative. These objects are obtained by the arrangement illustrated in the accompanying drawings, in which, Figures 1, 2, and 3 show a portion of film arranged according to my invention; Figs. 4, 5, and 6 illustrate the results obtained respectively from the film shown in Figs. 1, 2 and 3. Fig. 7 shows one method of preparing the film negative for using this invention.

The present invention, as shown, is used to introduce spoken or printed words to accompany certain parts of a scene. The common method used for this purpose at present is to discontinue the scene and display instead thereof a printed paragraph which is continued for a time sufficient for the average reader to read the printed matter, after which the scene is renewed. With the present invention the scene is not discontinued, the words are brought on the screen one or two at a time and are continued only for a time sufficient to be grasped by the audience. The words of an entire paragraph are thus, successively presented on the screen and can be read without difficulty while the eye follows the action of the scene. Another advantage lies in the fact that since only one or two words appear at a time, each person must read at the same speed and there is no possibility of confusion between lines.

Referring to the drawings, 11, 12 and 13 represent short sections of film having the picture scenes 14 printed thereon. 15 represents blank spaces in the film between the picture scenes in which the super-posed characters are printed. The super-posed characters on film 11 are indicated at 16, on film 12 at 17 and on film 13 at 18 which make up the words "Those cards are marked."

As indicated, a portion of the picture is shaded and a portion 27 is light, the printed characters are arranged to appear in the light part of the picture as indicated in Figs. 4 and 5 where 21 shows the shaded scene and 22 the printed characters. In practice however, the printed characters are spaced to adjoin the person speaking. In film 13, for instance, the light portion 28 is smaller than 27 and the word "marked" shown at 26, Fig. 6 is correspondingly spaced with relation to the shaded portion 25.

In preparing these films the scene is photographed in the usual way on the film negative. Where insertions with diffused characters are required the film is cut as at 31, Fig. 7 and the insertion 32 cemented to it to be followed by another picture and this condition is repeated any number of times desired. These films can thus be produced without any change in existing methods other than this simple operation of the film negative.

Printed characters usually appear white on a black background as indicated at 24 on film 13. The alternate production of a dark or opaque picture with a scene will cause a mechanical diffusion tending to dim the scene and thus, by contrast, bring out the printed characters more strongly. Where the printed characters are produced on a white background the film can be speeded up in the projector to guard against the possibility of "flicker" from the white spaces.

It should be noted that paragraphs can be displayed by this method without using any more film than where the entire paragraph is displayed at once. This is due to the fact that the time for reading is not increased and, in fact, is somewhat reduced.

Having thus described my invention, I claim:

1. A motion picture film having successive spaced portions provided with successive pictures and corresponding spaced portions of equal size between said pictures occupied by descriptive matter to cause such descriptive matter when the film is projected upon a screen to have an apparent effect of being superposed upon said picture.

2. A motion picture film having successive spaced portions provided with successive pictures and correspondingly spaced portions of equal size between said pictures occupied by descriptive matter said descriptive matter positioned with relation to the scene on said pictures and arranged, so that when the film is projected upon the screen the descriptive matter will have an apparent effect of being superposed upon said picture.

3. A motion picture film having successive spaced portions provided with successive pictures of a progressive scene and correspondingly spaced portions of equal size between said pictures occupied by pictures of a stationary scene to cause such stationary scene, when the film is projected upon a screen, to have an apparent effect of being superposed upon said progressive scene.

4. A motion picture film having successive spaced portions provided with successive pictures of a progressive scene and correspondingly spaced portions of equal size between said pictures occupied by different scenes to cause said latter scenes, when the film is projected upon a screen to have an apparent effect of being superposed upon said pictures.

5. A motion picture film having successive spaced portions provided with successive pictures of a progressive scene and corresponding spaced portions of equal size between said pictures occupied by different scenes and of different density from said pictures, whereby said latter scenes when the film is projected upon a screen have an apparent effect of being superposed upon said pictures and changing the intensity of said picture.

6. A motion picture film having successive spaced portions provided with successive pictures and corresponding spaced portions of equal size between said pictures occupied by single words or short sentences to cause said words or sentences, when the film is projected upon a screen, to have an apparent effect of being superposed upon said picture.

Signed at New York, in the county of New York and State of New York, this 20th day of August, A. D. 1919.

OLE ANDREW OWEN.